(12) United States Patent
Tiner

(10) Patent No.: US 11,982,080 B2
(45) Date of Patent: May 14, 2024

(54) STACK-IT BRACKET

(71) Applicant: James Tiner, Round Rock, TX (US)

(72) Inventor: James Tiner, Round Rock, TX (US)

( * ) Notice: Subject to any disclaimer, the term of this patent is extended or adjusted under 35 U.S.C. 154(b) by 0 days.

(21) Appl. No.: 18/196,942

(22) Filed: May 12, 2023

(65) Prior Publication Data
US 2023/0358032 A1   Nov. 9, 2023

Related U.S. Application Data

(63) Continuation-in-part of application No. 17/401,274, filed on Aug. 12, 2021, now abandoned.

(51) Int. Cl.
*E04B 1/26* (2006.01)
*A47B 96/06* (2006.01)

(52) U.S. Cl.
CPC ............ *E04B 1/2608* (2013.01); *A47B 96/06* (2013.01)

(58) Field of Classification Search
CPC .......... E04B 1/2608; E04B 1/003; E04B 1/26; E04B 1/2604; A47B 96/06; F16B 12/00; F16B 12/44
See application file for complete search history.

(56) References Cited

U.S. PATENT DOCUMENTS

| | | | |
|---|---|---|---|
| 2018/0238041 A1* | 8/2018 | Styrc | E04F 10/02 |
| 2019/0136505 A1* | 5/2019 | Bedel | E04B 1/2604 |

* cited by examiner

*Primary Examiner* — Lee A Holly
(74) *Attorney, Agent, or Firm* — Edison Law Group

(57) ABSTRACT

A one-piece joint including a first member, a second member, and a third member is disclosed. Each member has a length and includes its own internal region. The second member is unitary with the first member and is disposed transverse to it. The third member, unitary with each of the first and second members, is disposed transverse to the other two members. Each member has an opening communicating with its interior region.

4 Claims, 16 Drawing Sheets

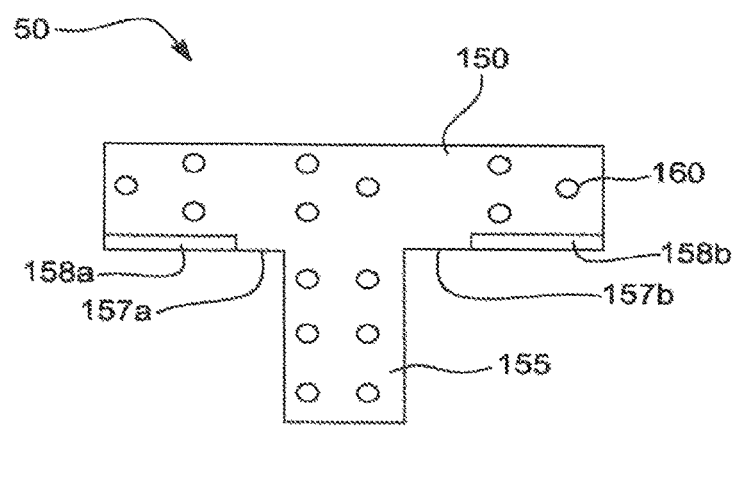
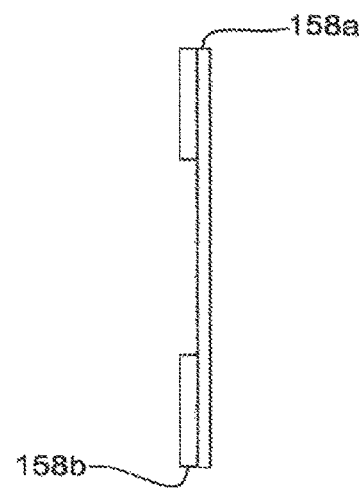
FIG. 2a
FIG. 2b
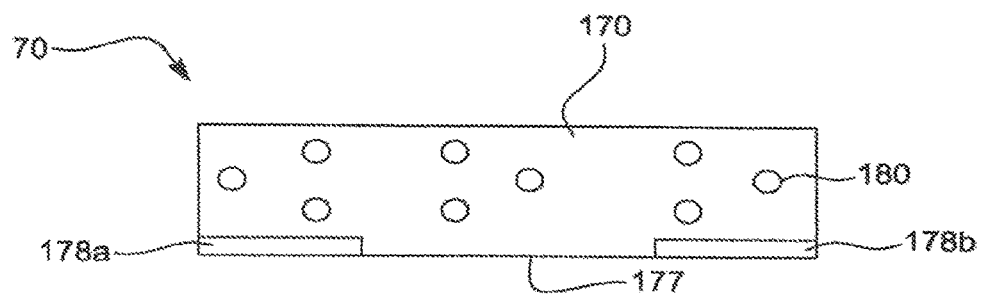
FIG. 3a
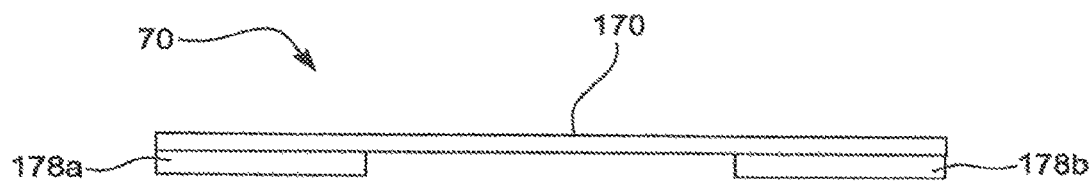
FIG. 3b

STACK-IT BRACKET

REFERENCE TO RELATED APPLICATION

This patent application is a continuation-in-part ("CIP") of U.S. patent application Ser. No. 17/401,274 filed Aug. 12, 2021, hereby incorporated by reference in its entirety for purposes of priority pursuant to Title 35, United States Code, Section 120.

TECHNICAL FIELD

The present subject matter is generally directed to a joint used with lumber and is more particularly directed to a joint, when used with lumber, provides a storage system.

BACKGROUND

While U.S. Pat. No. 4,283,900 to Schubert shows corner braces for constructing buildings. U.S. Pat. No. 4,685,576 to Hobson shows a three-axis corner bracket. U.S. Pat. No. 5,259,685 to Gilb discloses a rigid intersection connection. US publication 2010/0199585 to Stevens et al. shows support systems to mount building façade elements to framework. US publication 2017/0122493 to Dammann discloses truss storage crossbar brackets.

Current moving vans, PODS™, and cargo containers are difficult to load efficiently due to the height limitations of the storage spaces. "Moving Platforms" provide a means for allowing improved placement of items in certain of these containers by converting the space into two levels. Additionally, there are many situations where an available storage space can be better organized and configured to facilitate efficient storage. Shelving units, tables, platforms, and the like can be installed in storage spaces for additional storage of items, placement of organizers, drawers, and such for storage. This in turn enables easier placement and retrieval of items in that space. Unfortunately, no two storage spaces are alike, and storage may be required in various situations, such as sheds, attics, vehicles, etc. Due to such variety, it is difficult to provide a cost-effective, one-size-fits-all solution.

Therefore, a present need exists for an article of manufacture, such as the joint of the present subject matter, to allow unlimited custom sizing of fixtures used in moving and shelf-storage systems. The present subject matter solves problems, limitations, and deficiencies in the prior art, as demonstrated by example embodiments disclosed herein.

SUMMARY

Problems experienced by a person of ordinary skill in the prior art ("POSITA") are solved by joints of the present subject matter when utilized to construct storage systems.

The present subject matter is thus for a joint and a system which includes the joint.

A one-piece joint of the present subject matter comprises a first member, a second member, and a third member. The first member has a first predetermined length and has a first predetermined interior region. The second member is unitary with the first member and is disposed transverse to it. The second member has a second predetermined length and has a second predetermined interior region. The third member is unitary with each of the first and second members. The third member, disposed transverse to the first and second members, has a third predetermined length and a third predetermined interior region. The first member has a first opening communicating with the first interior region. The second member has a second opening communicating with the second interior region. The third member has a third opening communicating with the third interior region.

A storage system of the present subject matter includes the joint (described above) and an endcap having an opening into which a predetermined length of lumber is inserted.

While the foregoing has broadly outlined the features and technical advantages of the present subject matter, a detailed description (further below), shall refer to the figures.

It should be appreciated by a person of ordinary skill in the prior art ("POSITA") that the concept and specific embodiments disclosed herein may be readily utilized as a basis for modifying or designing a variety of other structures for carrying out the same purposes of the present subject matter. It should also be realized by a POSITA that such equivalent constructions do not depart from the spirit and scope of the present subject matter as set forth in the appended claims. The novel features that are believed to be characteristic of the present subject matter, both as to its organization and method of operation, along with additional objects and advantages, will be better understood from the following description when considered in connection with the accompanying figures.

It is to be expressly understood, however, that the figures are provided for the purpose of illustration and description only and are not intended to limit the present subject matter.

BRIEF DESCRIPTION OF THE FIGURES

FIGS. 2a and 2b depict exemplary top and side views of an intermediate leg bracket for a moving and shelf-storage system according to the present subject matter.

FIGS. 3a, 3b depict exemplary plan and side edge views of another intermediate bracket for a moving and shelf-storage system according to the present subject matter.

Throughout the drawing figures and the detailed description below, I shall use similar reference numerals to refer to similar components of the present subject matter.

DETAILED DESCRIPTION

Figure 10:
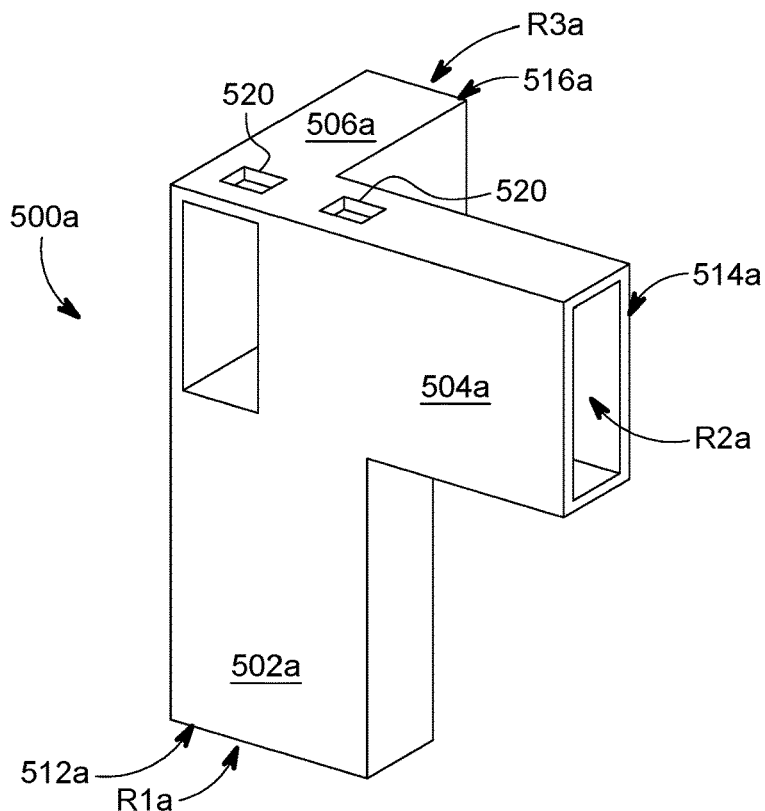
FIGS. 10 and 11 are isometric views, depicting mirror images of a joint component, designed for a moving and shelf-storage system, according to the present subject matter.
Figure 11:
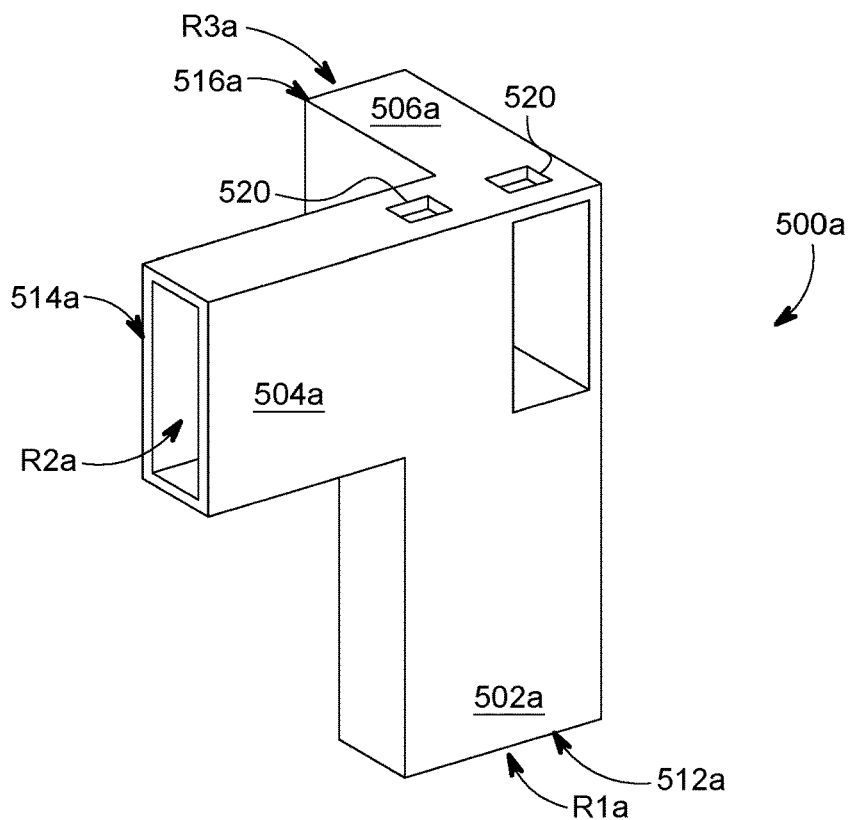

Referring initially to FIGS. 10 and 11, one embodiment of a joint component 500a (hereinafter simply referred to as "joint 500a") of the present subject matter comprises a first member 502a, a second member 504a, and a third member 506a. The first member 502a of the joint 500a of the present subject matter has a first predetermined length L1a and defines a first predetermined interior region Ria. The second member 504a is unitary with the first member 502a and is disposed transverse, preferably orthogonal, to the first member 502a. The second member 504a has a second predetermined length L2a and defines a second predetermined interior region R2a. The third member 506a is unitary with each of the first and second members 502a, 504a. The third member 506a, disposed transverse, preferably orthogonal to, each of the first and second members 502a and 504a, has a third predetermined length L3a and defines a third predetermined interior region R3a. The first member 502a has a first opening 512a which communicates with the first interior region Ria. The second member 504a has a second opening 514a which communicates with the second interior region R2a. The third member 506a has a third opening 516a which communicates with the third interior region R3a. A surface portion of this embodiment of the joint 500a includes at least one depression 520 used to vertically stack moving and/or shelf-storage systems in accordance with the present subject matter.

Figure 12:
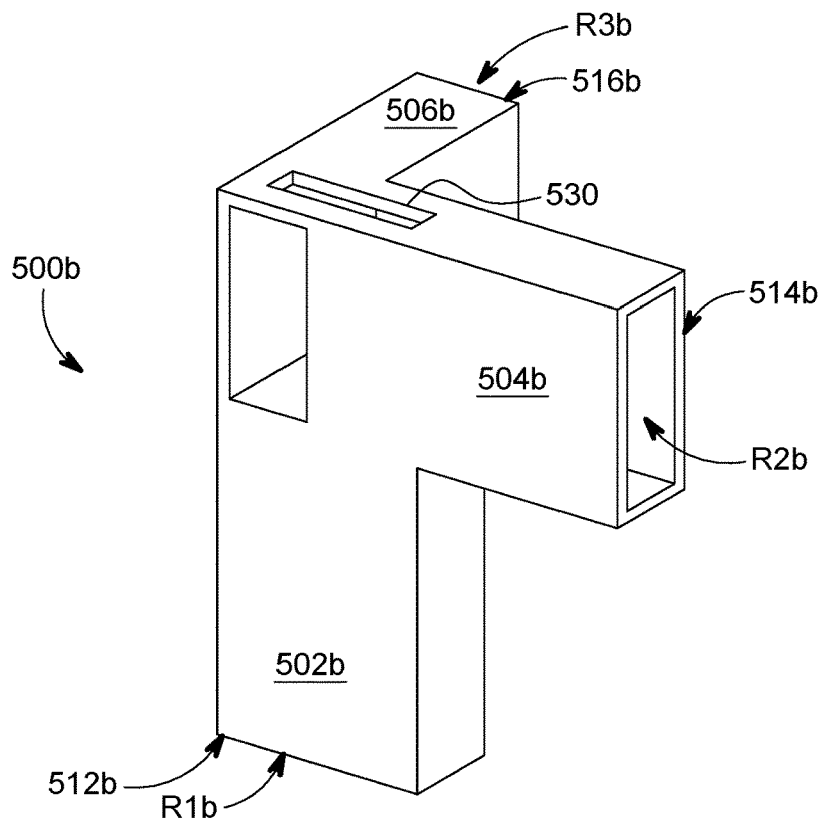
FIGS. 12, 13 are isometric views of mirror images of another embodiment of a joint designed for moving and/or shelf-storage systems pursuant to the present subject matter.
Figure 13:
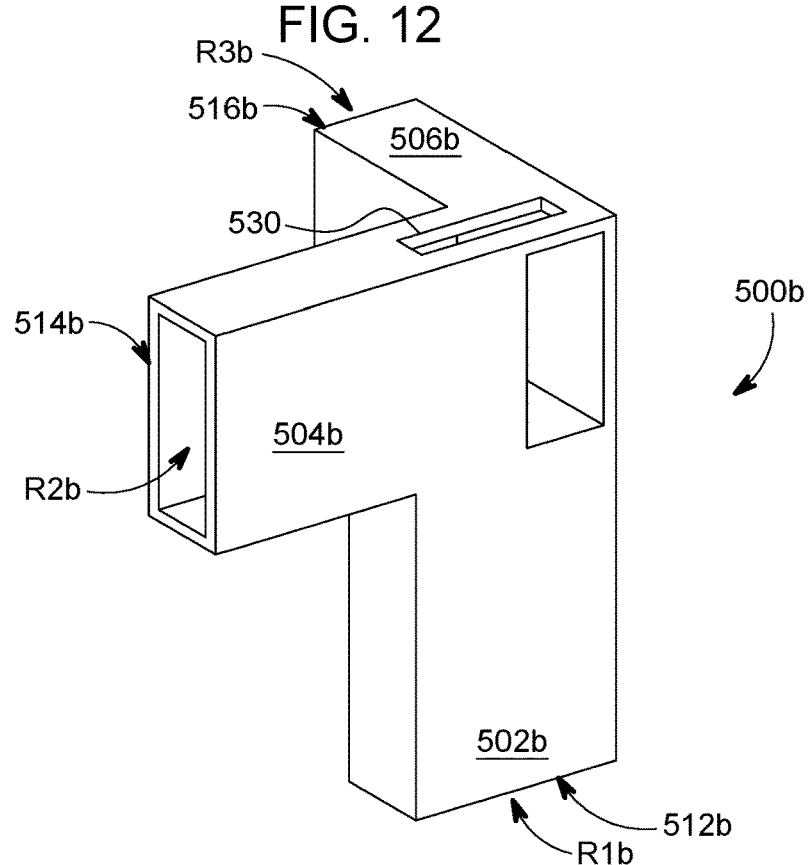

Referring next to FIGS. 12 and 13, another embodiment of a joint component 500b (hereinafter simply referred to as "joint 500b") of the present subject matter comprises a first member 502b, a second member 504b, and a third member 506b. The first member 502b of the joint 500b of the present subject matter has a first predetermined length Lib and defines a first predetermined interior region R1b. The second member 504b is unitary with the first member 502b and is disposed transverse, preferably orthogonal, to the first member 502b. The second member 504b has a second predetermined length L2b and defines a second predetermined interior region R2b. The third member 506b is unitary with each of the first and second members 502b, 504b. The third member 506b, disposed transverse, preferably orthogonal to, each of the first and second members 502b and 504b, has a third predetermined length L3b and defines a third predetermined interior region R3b. First member 502b has a first opening 512b communicating with first interior region Rib. The second member 504b has a second opening 514b communicating with the second interior region R2b. The third member 506b has a third opening 516b which communicates with the third interior region R3b. A surface portion of this embodiment of the joint 500b includes at least one opening 530, preferably elongated, used to vertically stack moving and/or shelf-storage systems in accordance with the present subject matter.

The joints 500a and 500b, of one-piece construction, can be made from polymeric materials (including but limited to polyethylene, polypropylene, and polyurethane) which can, for example, be shaped and/or formed from known techniques including 3-D printing.

In certain embodiments of the joints 500a and 500b of the present subject matter, the first length of the first member, the second length of the second member, and the third length of the third member are equal. In other embodiments of the joints 500a and 500b of the present subject matter, the first opening, the second opening, and the third opening are rectangular. Each rectangular opening has a length dimension and a width dimension.

In certain such embodiments of the joints 500a and 500b of the present subject matter, the length and width dimensions of the first opening, the length and width dimensions of the second opening, and the length and width dimensions of the third opening are equal.

Figure 14:
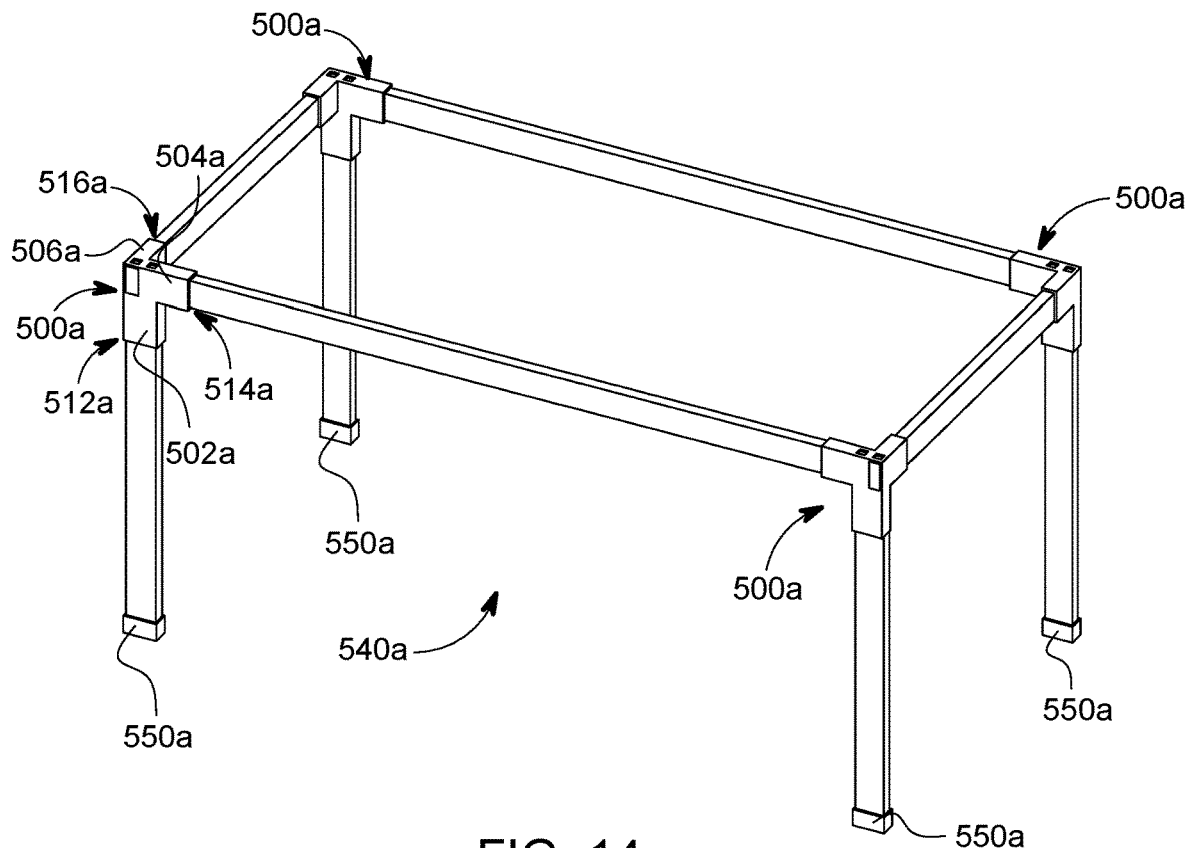
FIGS. 14 and 15 are isometric views of embodiments of storage systems, including the joints shown in FIGS. 10 through 13, in accordance with the present subject matter.
Figure 15:
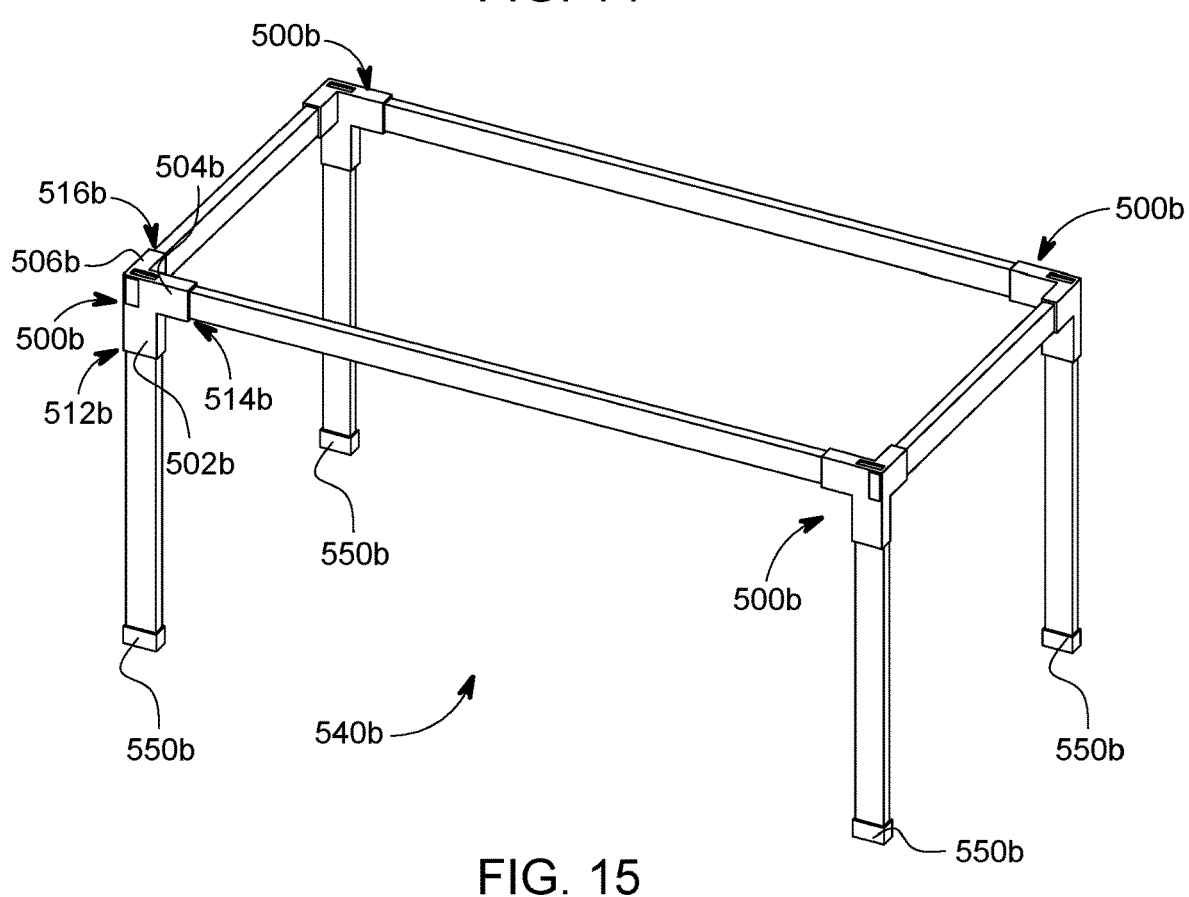

Two illustrated embodiments of a moving and/or storage system 540a and 540b in accordance with the present subject matter are shown in FIGS. 14 and 15. One such system 540a (FIG. 14) includes the joint 500a. The other moving and/or storage system 540b (FIG. 15) includes the joint 500b. The joints 500a, 500b are both described above.

Figure 17:
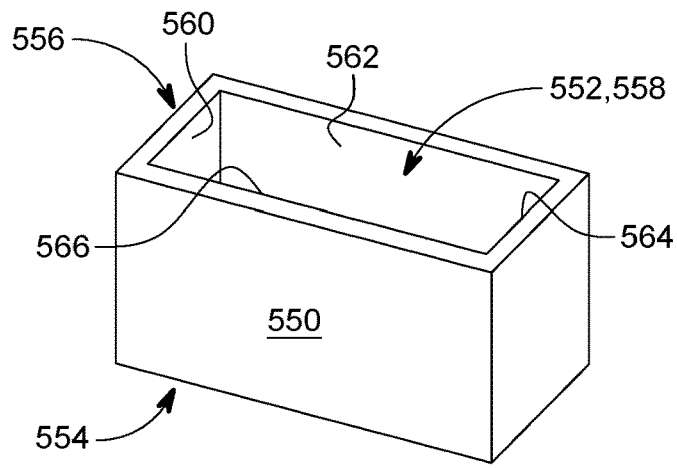
FIG. 17 presents an isometric view of an endcap component of the storage system of the present subject matter, on an enlarged scale relative to FIG. 14 through FIG. 16.

As described above for joint 500a, the first member 502a defines a first opening 512a communicating with the first interior region, the second member 504a defines a second opening 514a communicating with the second interior region, and the third member 506a defines a third opening 516a communicating with the third interior region. Similarly, as described above for joint 500b, its first member 502b defines a first opening 512b communicating with the first interior region, its second member 504b defines a second opening 514b communicating with the second interior region, and its third member 506b defines a third opening 516b communicating with the third interior region. For each joint 500a and 500b of the present subject matter, member interior surfaces adjacent the first opening, the second opening, and the third opening frictionally engage exterior surfaces of predetermined lengths of a support member, such as lumber, which is inserted into each opening. Thus, the moving and/or shelf-storage system 540a, 540b of the present subject matter can include a predetermined number of support members, some being disposed vertically and others disposed horizontally, including endcaps 550a, each with an internal region 552 and having opposite end portions 554 and 556 (FIG. 17).

An illustrated endcap 550 (FIG. 17) has a hollow interior and defines at least one projection extending from one end 554 of the spaced-apart opposite-end portions 554, 556 of the endcap 550. The endcap 550 includes an opening 558 at the other end 556 of the spaced-apart opposite-end portions 554, 556 of the endcap 550. Interior surfaces 560, 562, 564, and 566 of the endcap 550 adjacent opening 558 frictionally engage an exterior surface if cylindrical (or exterior surfaces if rectangular or square in cross section) of predetermined lengths of a moving and/or shelf-storage support member, such as a predetermined length of lumber, either square in cross section, e.g., 4-inch (101.6 mm) by 4-inch (101.6 mm), or rectangular in cross section, e.g., 2-inch (50.8 mm) by 4-inch (101.6-mm) or 2-inch (50.8 mm) by 6-inch (152.4-mm) lumber, inserted into each opening.

Briefly reviewing FIG. 14, each endcap 550a shown defines a pair of spaced-apart projections extending from the end portion 554 (FIG. 17) for the purpose of providing an "interference fit" for snuggly fitting into the spaced-apart depressions 520 (FIGS. 10, 11) for safely vertically stacking each of the moving and/or shelf-storage systems 540a, 540b (exemplified by FIGS. 14 and 15). The "interference fit" is designed to provide safely vertically stacked systems of the present subject matter with superior stability. Similarly, each endcap 550b has a projection extending from the end portion 554 for providing an "interference fit" to snuggly fit into opening 530 (e.g., elongated, FIGS. 12, 13), to vertically stack the moving and/or shelf-storage systems, pursuant to the present subject matter.

An additional feature of the present subject matter includes a bracket designed for use in moving and shelf-storage systems in accordance with the present subject matter.

Additional components designed to be used in connection with the moving and/or shelf-storage systems of the present subject matter are further described in detail below.

Figure 1A:
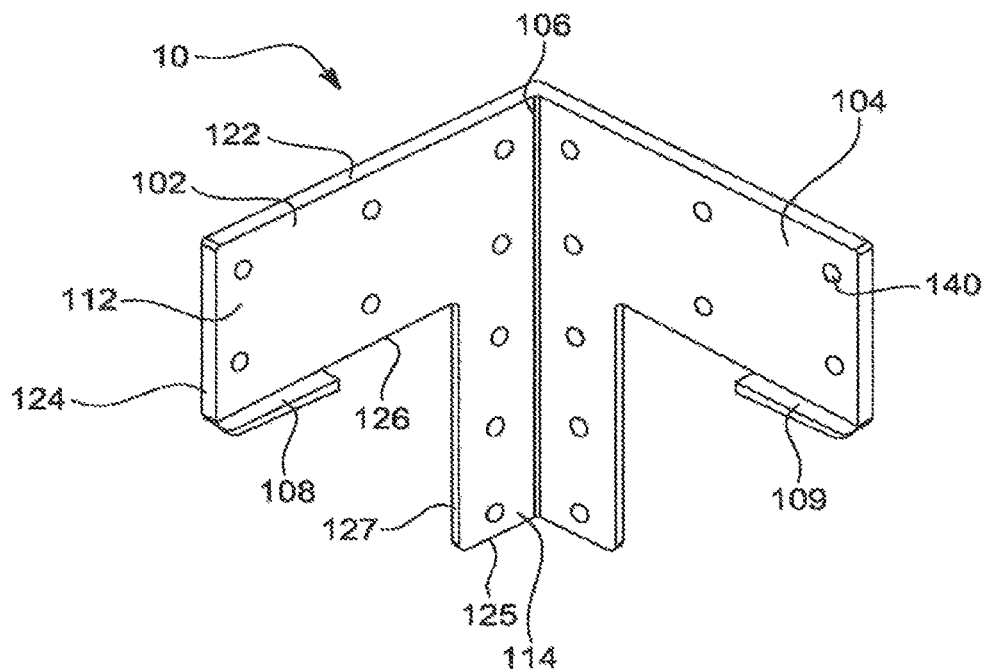
FIGS. 1a and 1b illustrate examples of a corner bracket as well as a stacked corner bracket for a moving and shelf-storage system according to the present subject matter.
Figure 1B:
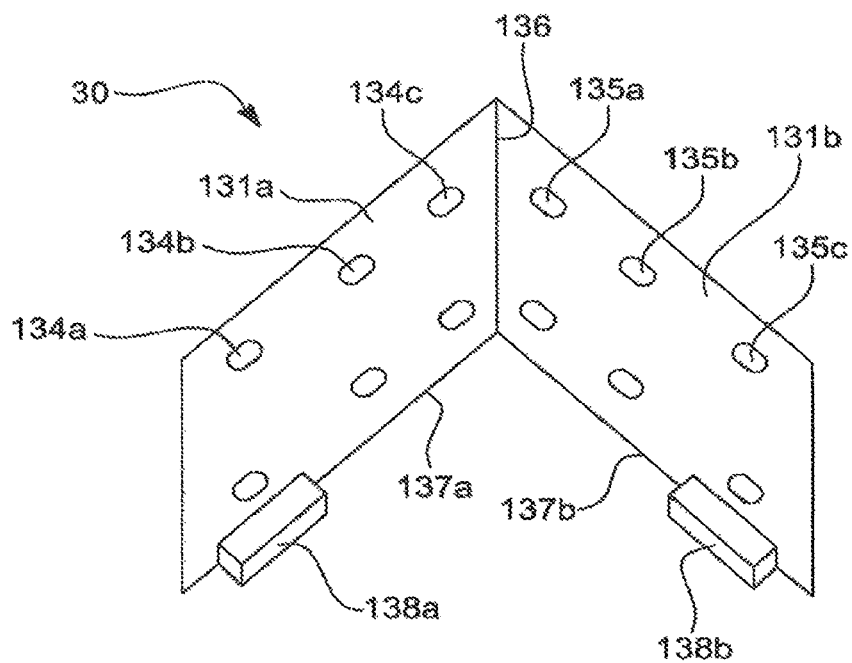

FIGS. 1a, 1b present a corner bracket and a stacked corner bracket for a moving and/or shelf-storage system according to the present invention. The shelf-storage system, configured for a range of storage spaces of varying sizes and shapes is described in detail as follows. The shelf-storage system of the present subject matter provides an advantage of being easy to assemble. One basis of this feature of the shelf-storage system of the present subject matter, in addition to the joints 500a and 500b, are brackets enabling convenient, quick assembly, and adaptability for providing structural integrity. The use of brackets disclosed herein thus permits members of the public to store articles, including clothing, using the joints 500a and 500b in combination with lumber of various cross sectional geometries including cylindrical and rectangular, along with brackets to produce aesthetically pleasing moving systems and efficient storage systems with minimal effort.

A first bracket member, presented generally at 10 in FIG. 1a as a stacked corner bracket member 10, is a corner bracket that allows orthogonal frame members to be selectively connected to each other to create a stacked platform and/or shelf support. An intermediate corner bracket member is shown at 30 in FIG. 1b. Another intermediate leg bracket member 50 is flat and T-shaped (FIG. 2a), to allow longitudinal frame members to be selectively connected to each other and to create a stacked platform shelf support. Another bracket member, shown as an intermediate shelf bracket 70 in FIGS. 3a and 3b, is designed as a flat, broad-shaped shelf bracket that allows longitudinal frame members to be selectively connected to an orthogonal member to create a platform shelf support.

The corner bracket 10 (shown in FIG. 1a) includes three orthogonal elements that facilitate securing a framework together. Corner bracket 10 may be formed from sheet metal by cutting a required shape, then bending to form an angle bracket having a first plate 102 joined to a second plate 104 at a right-angle bend 106. Plates 102 and 104 are similar and symmetrical, formed from orthogonal elements of corner bracket 10. While the following primarily describes plate 102 a similar description also applies to plate 104.

As noted, sheet metal may be cut to shapes that form specific shapes for plate 102. Plate 102 includes a broad ("lengthwise-wide") section 112 and a narrow section 114. The broad section 112 extends laterally from the angle 106 for a predetermined length or distance. The broad section 112 includes a top edge 122, a forward edge 124, and a bottom edge 126. In one embodiment, the width or distance of the broad section 112, i.e., the predetermined length or distance of the top edge 122, is 155.2 millimeters (6.11 inches) but also could be any arbitrary length. The height of the broad section 112, i.e., the height of the forward edge 124, could be approximately 82.55 millimeters (3.25 inches) and is selected to substantially match an associated dimension of timber frame members which will be used in the framework as will be described in more detail below.

The narrow section 114 extends perpendicularly from the bottom edge 126 of the broad section 112 for a predetermined length or distance. The narrow section 114 includes a forward edge 127 and a bottom edge 125. In one embodiment, a height of the narrow section 114, i.e., the height of forward edge 127 is 120.7 millimeters (4.75 inches) but may be arbitrary. The width of the narrow section 114, i.e., depth of the bottom edge 125 may be 44.2 mm. (1.74 in.) and is chosen to substantially match an associated side of the timber that will be used in the framework as will be described in more detail below.

Extending from the bottom edge 126 of the broad section 112 inwardly toward a region bounded by the plates 102 and 104 is yet another plate member 108 disposed orthogonally to the plates 102 and 104, with member 108 providing a support, or guide, for timber framework as will be described in more detail below. In one embodiment, plate member 108 extends inward (orthogonal) of the broad section 112 for about 12.7 mm. (0.5 in.), though this distance may be arbitrary. Such plate member 108 may extend about 50.8 mm. (2 in.) along the bottom edge 126, although this distance also may be arbitrary. Plate 104 has features described above for plate 102, except plate 104 has member 109.

The corner bracket 10 may be used to conveniently assemble orthogonal frame members, e.g., timber frame members as will be described herein. Plates 102 and 104 are thus provided with a plurality of apertures or holes 140 (FIG. 1a) to affix means such as screws to connect the bracket to frame members. Arrays of holes 140 may be arranged using any pattern with a preferred embodiment having an arrangement of holes 140 distributed about the broad section 112 and the narrow section 114 of corner bracket 10.

FIG. 1b presents yet another corner shelf bracket in accordance with the present subject matter. Such a corner shelf bracket 30, illustrated by FIG. 1b, includes a pair of broad members 131a and 131b arranged about a corner bend 136 in a manner similar to the corner bend 106 formed at the dihedral angle between the plates 102 and 104 of the bracket 10 shown in FIG. 1a. Corner bracket 30 similarly includes a spaced-apart pair of orthogonal plate members 138a, 138b extending from the broad members 131a, 131b adjacent respective bottom edges 137a, 137b. An aligned, spaced-apart arrangement of apertures or holes 134a, 134b, and 134c (through broad member 131a) and another aligned, spaced-apart arrangement of apertures or holes 135a, 135b, and 135c (through broad member 131b) are positioned through the broad members 131a and 131b for enabling bracket 30 to be mounted about a corner. As with bracket 10, the extension of plates 138a, 138b from members 131a, 131b and the number and arrangement of holes 134a-c, 135a-c may vary as needed in the various embodiments of the corner bracket 30.

FIGS. 2a, 2b present the face and side-edge views of an intermediate leg bracket 50 of a shelf-storage system in accordance with the present subject matter. A facial view of intermediate bracket 50 is shown in FIG. 2a. A side-edge view of bracket 50 is shown in FIG. 2b. Bracket 50 resembles bracket 10, except for right-angle bend 106. Bracket 50 may be formed from sheet metal by cutting to a predetermined, desired shape. Bracket 50 comprises a lengthwise-wide plate member 150 and an integral lengthwise-narrow member 155 extending downwardly from spaced-apart bottom edges 157a, 157b of the lengthwise-wide plate member 150. Bracket 50 includes a pair of spaced-apart orthogonal plate members 158a, 158b extending from the bottom edges 157a, 157b of member 150.

Wide plate member 150 and integral lengthwise-narrow member 155 are each provided with a predetermined array of apertures or holes 160 to allow means such as screws to be used to affix bracket 50 to frame members such as lumber. As with corner bracket 10 (FIG. 1a), the holes 160 may be arranged using any pattern with a preferred embodiment having the array of holes 160 distributed substantially along the entire width of member 150 and substantially along the height of vertical member 155 of T-shaped bracket 50. Similar to corner bracket 10, the T-shaped bracket 50 may be dimensioned to substantially match the dimensions of a length of timber to be used for the framework.

The present bracket design enables using a predetermined length of lumber to extend from under an upper member, stacked above it, and then to pass through a shelf layer disposed beneath it, for proving superior structural designs for tabletops or platforms while maintaining smooth outer and inner surfaces for maximizing aesthetic appearance.

FIGS. 3a, 3b also present an intermediate leg shelf bracket 70 for a shelf-storage system according to the present invention. A front view of an intermediate shelf bracket 70 is shown in FIG. 3a and a top view of the intermediate shelf bracket 70, is shown in FIG. 3b. Intermediate bracket 70 may be formed from sheet metal by cutting to a desire, predetermined shape. Intermediate shelf bracket 70 comprises a horizontally wide plate member 170 (FIG. 3a), and a spaced-apart pair of orthogonal plate members 178a, 178b (FIG. 3b) extending from a bottom edge portion 177 of the horizontally wide member 170.

The horizontally wide member 170 includes a predetermined array of apertures or holes 180 for allowing means, e.g., screws to affix the bracket 70 to frame members. As disclosed for bracket 10 (FIG. 1a) the holes 180 may be arranged using any pattern with a preferred embodiment having the array of holes 180 distributed substantially along the entire width of member 170. Like the bracket 10, the shelf bracket 70 may be dimensioned to substantially match the dimensions of a length of timber to be used for the framework.

Figure 4B:
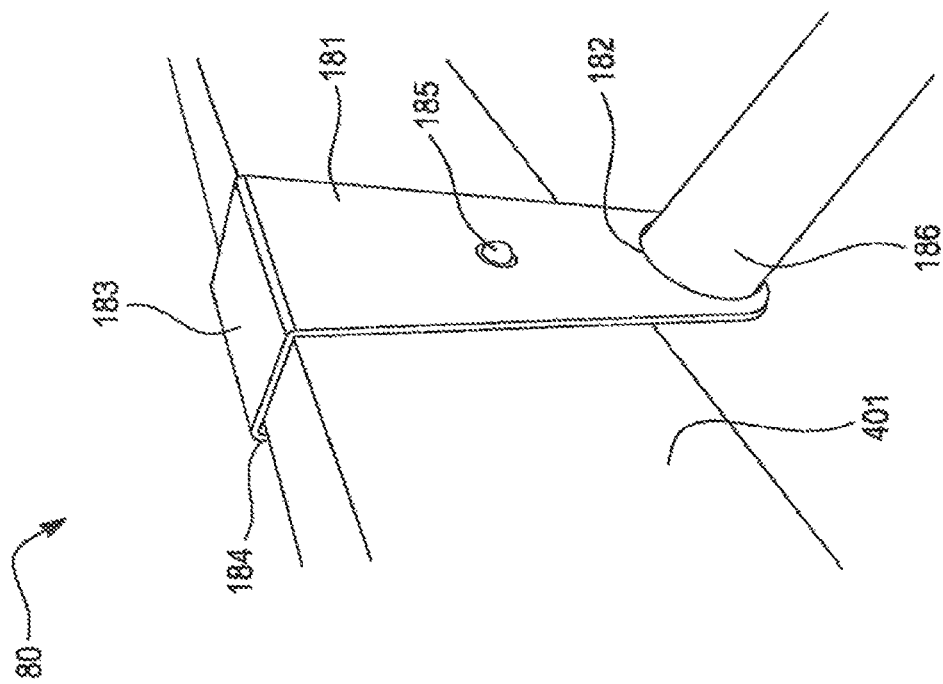
FIGS. 4a and 4b present perspective views of a bracket for a rod (to hang clothes), when used in a moving and shelf-storage system, according to the present subject matter.
Figure 4A:
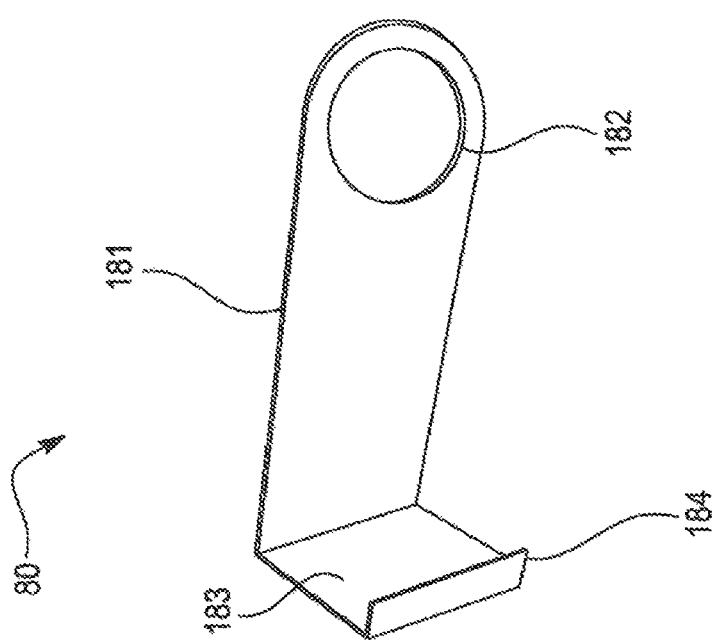

FIGS. 4a and 4b illustrate use of an article of manufacture for a clothes-hanging rod bracket 80 in a moving and/or shelf-storage system according to the present subject matter. The clothes-hanging rod bracket 80 (FIG. 4a) includes an upper member 183 with a tab 184 (for retention purposes) and a rod-support member 181 extending downwardly from a lateral support member 401 (FIG. 4b). Width of the upper member 183, between the rod-support member 181 and the retention tab 184, is dimensioned to match a width value of support member 401, for permitting the retention tab 184 and the rod-support member 181 to rest against vertical sides of support member 401, as shown in FIG. 4b.

The rod-support member 181 includes a rod-insertion hole or aperture 182 sized to support a cylindrical rod 186 (made, e.g., of wood or a polymeric material). A securing screw 185 through the rod-support member 181 is used to removably retain the clothes hanging bracket 80 in place. The rod-insertion aperture or hole 182, while sized to match the diameter of a particular cylindrical rod 186, can be sized to match different diameters.

Figure 5B:
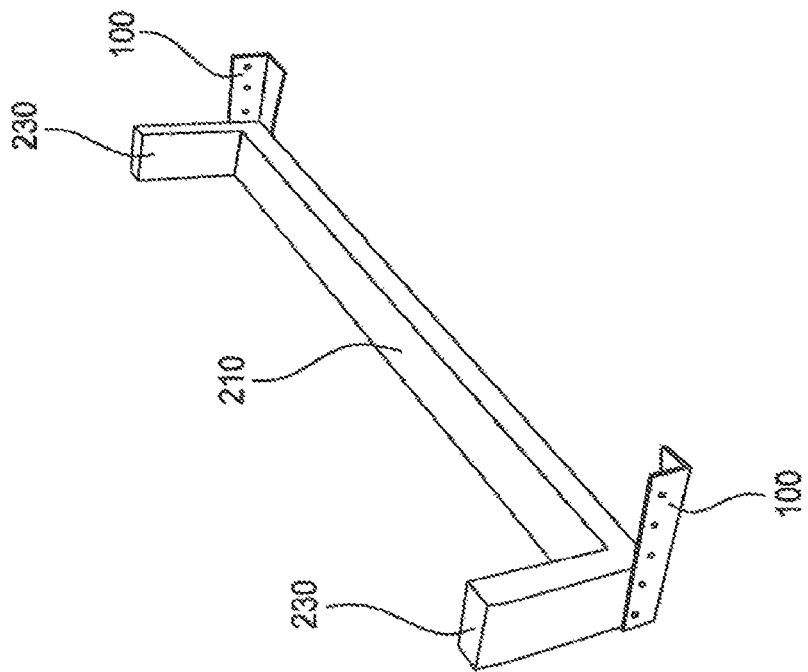
FIGS. 5a through 5d show corner brackets, along with lengths of lumber serving as "spacer blocks" for positioning these brackets, according to the present subject matter.
Figure 5A:
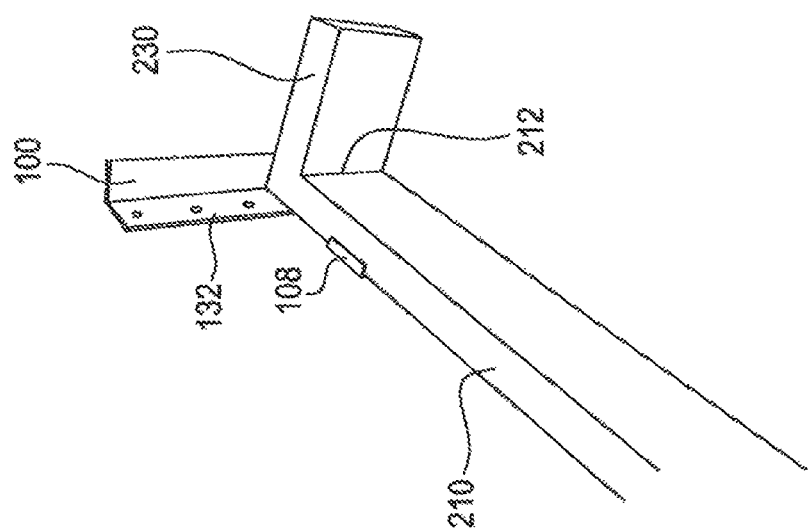

FIGS. 5a, 5b, 5c, and 5d illustrate a corner bracket for a shelf-storage system in accordance with the present subject matter. FIG. 5a shows an initial stage of a framework assembly. To assemble, a first lateral frame member 210 is laid upon a support platform. Bracket 100 (FIG. 5a) is arranged such that its orthogonal plate 108 rests on an underside edge of the frame member 210, shown rotated 90° (FIG. 5b). Inner surfaces of the wide section of bracket 100 are oriented adjacent to exterior corner-edge portions of lateral frame member 210. A corner portion 212 (FIG. 5a) of elongated member 210 is aligned with a side edge 132 (FIG. 5a) of a narrow section of bracket 100 (FIG. 5b). To facilitate such alignment, a spacer block 230 (FIGS. 5a, 5b) may optionally be used temporarily, with end faces of frame member 210 abutting spaced-apart end portions of blocks 230. Screws can also be used to removably retain the bracket 100 to the frame member 210.

FIG. 5b also depicts a second bracket 100 removably secured to the opposite end of the frame member 210. At this stage, the spacer blocks 230 remain in place at each of the brackets 100. Additional frame members may be attached orthogonally to the lateral frame member 210 and then affixed to each of the brackets 100. The spacer blocks 230, temporarily placed to position brackets 100 for attachment, can thereafter be removed.

Figure 5D:
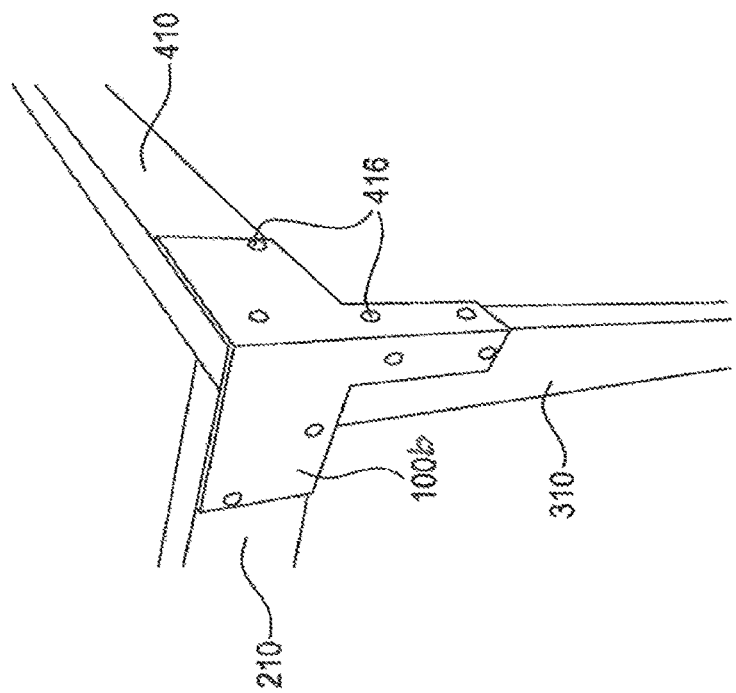
Figure 5C:
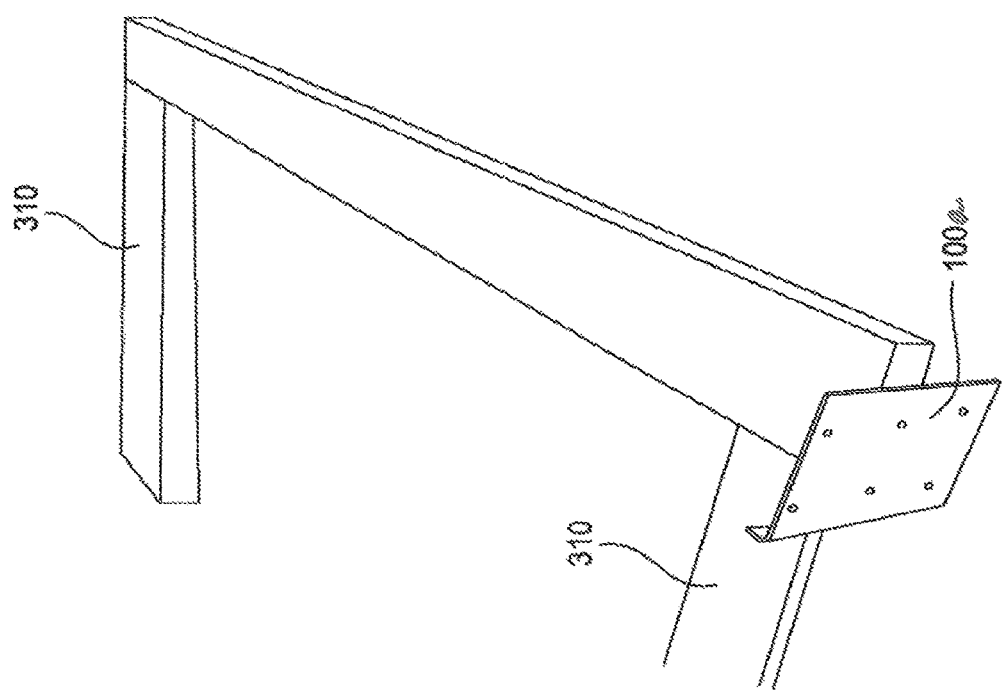

In FIG. 5c, two frame members 310 (later oriented vertically) are shown, with one of frame members 310 affixed to another plate 100a, with spaced-apart end portions of the two frame members 310 abutting a narrow edge portion of yet another frame member. Screws may be inserted through some or all the holes or apertures through the plate 100a, for affixing one of the two vertical frame members 310 to plate 100a. In FIG. 5c, the spacer blocks have been removed. A gap (left by the now absent spacer blocks) allows additional lateral frame members to be inserted and affixed to the plate 100a with screws.

FIG. 5d shows a bracket 100b affixed to three orthogonal frame members 210, 310, and 410. Screws 416 secure bracket 100b to each of the frame members 210, 310, 410. Also, widths and heights of portions of bracket 100b are matched to the dimensions of the frame members to make installing the bracket 100b straightforward, after alignment of the edges. Plate 100a and bracket 100b, when used together, permit frame members of one system to be stacked atop those of another system (see, e.g., FIGS. 9b, 16) when supported by vertically oriented members or legs 310. Additionally, the pair of orthogonal plate members 108, 109 (shown in FIG. 1a) engage a bottom edge of an additional lateral member 210 and 410 to assist holding such additional lateral members 210, 410 in place.

Figure 6B:
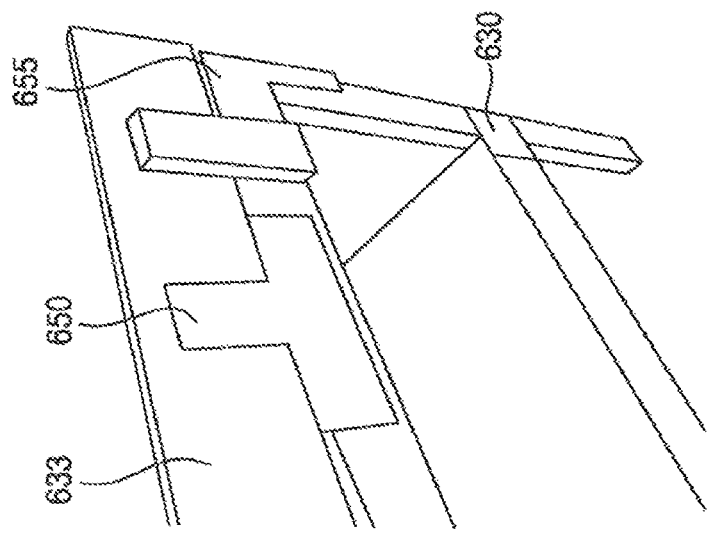
FIGS. 6a and 6b depict two exemplary embodiments of storage systems using the intermediate leg brackets and corner brackets, according to the present subject matter.
Figure 6A:
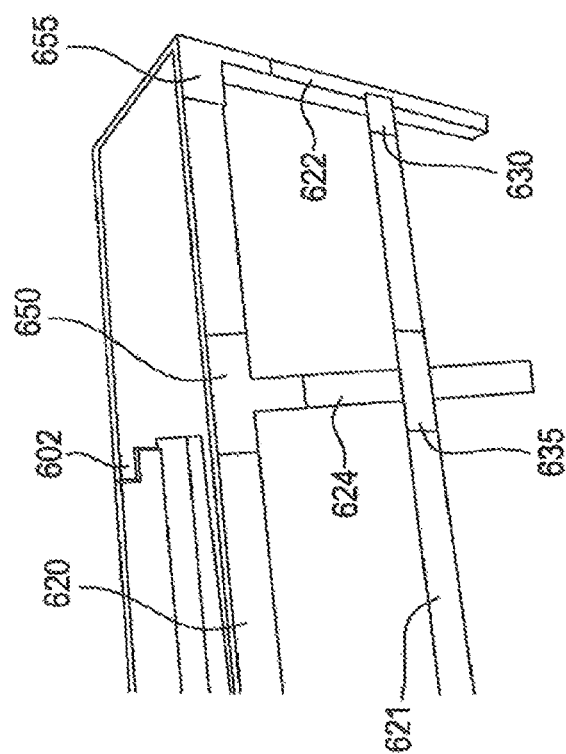

FIGS. 6a, 6b depict embodiments of intermediate leg brackets and stacked corner brackets, in accordance with the present subject matter. FIGS. 6a and 6b thus depict an intermediate leg bracket 650 secured to a horizontally disposed member 620 (FIG. 6a) or 633 (FIG. 6b) with the member 620 (preferably common lumber) oriented perpendicular in relation to a vertically disposed member 624 (also preferably of common lumber). Such construction allows member 620 to be placed atop member 624 in a stacked configuration for superior structural strength. While not shown in FIGS. 6a and 6b, the intermediate leg bracket 650 includes a pair of orthogonal plate members 158a 158b (shown in FIG. 2b) for abutting a bottom edge of the horizontal lumber member 620 for purposes of assisting in aligning longitudinal orientation between horizontal lumber member 620 and a vertically arranged lumber member 624 for purposes of achieving superior stability for the system.

FIGS. 6a, 6b also show a lower corner bracket 630 and an intermediate shelf bracket 635 which serve to support and stabilize additional horizontal and vertical lumber members. A vertical lumber member extends through a lower shelf bracket 635. A shelf support horizontal member 621 terminates at leg 622 and is supported by a retention tab and screws through bracket 635. A corner bracket 655 provides an upper corner for a workbench 602 (FIG. 6a) made from predetermined lengths of lumber when using several of the brackets described in detail. In a separate configuration, the intermediate T-shaped bracket 650 is shown inverted (in FIG. 5b) as compared to normally oriented, as shown in FIG. 6a, to support a backstop for a work surface for the workbench 602. In FIG. 6a the T-shaped intermediate leg bracket 650 is affixed to vertical member 624, while in FIG. 6b the T-shaped leg bracket 650 supports a backstop surface 633 for the workbench 602.

Figure 7:
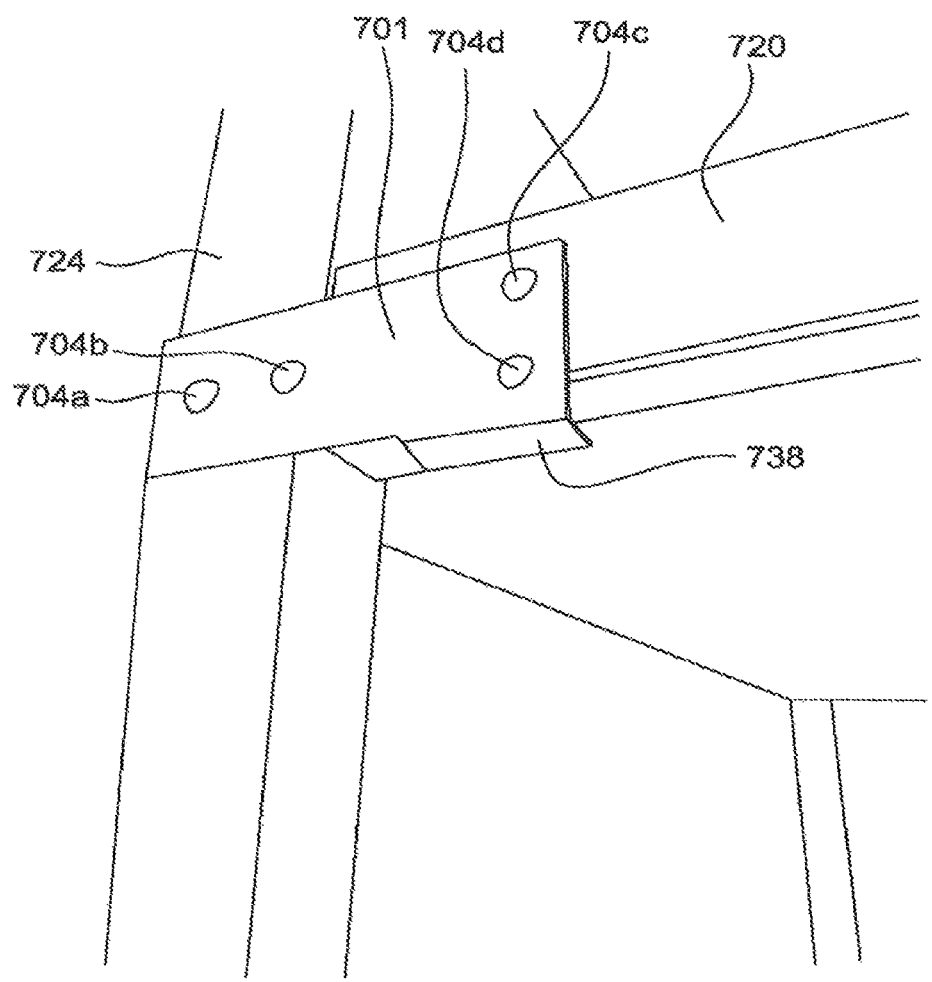
FIG. 7 shows an embodiment of a bracket according to the present subject matter.

FIG. 7, illustrating an embodiment of a corner bracket 701 in accordance with the present subject matter, presents an underside 738 of the bracket 701 used for connecting a horizontal lumber member 720 to a vertical lumber member 724. One member 738 of a pair of orthogonal plates is visible beneath the horizontal lumber member 720 to support its position for installation in the system. The horizontal and vertical lumber members 720, 724 are secured to the corner bracket 701 by a set of securing screws 704a through 704d.

Figure 8A:
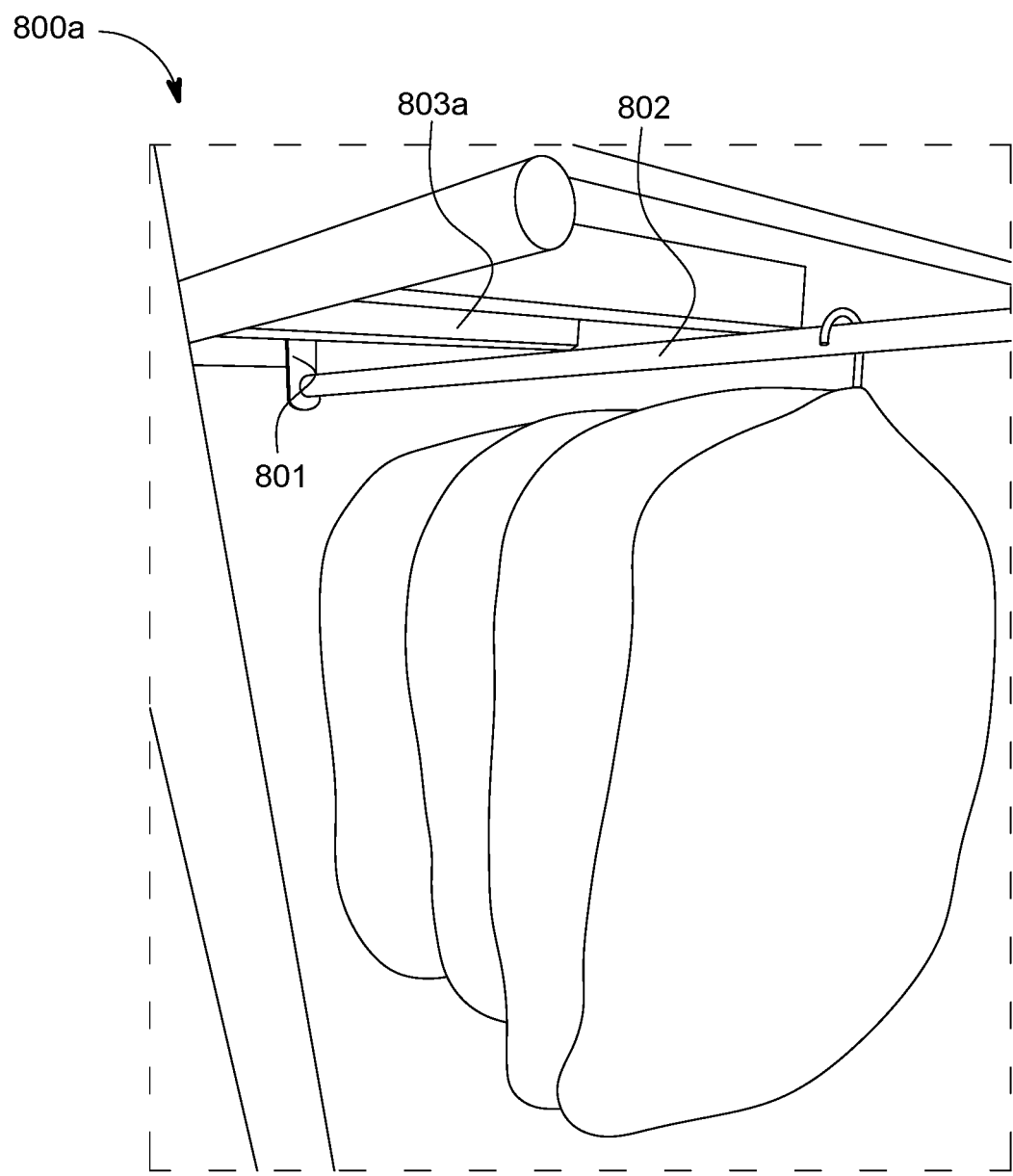
FIGS. 8a and 8b present perspective views of a bracket for a rod (to hang clothes), when used in a moving and shelf-storage system, according to the present subject matter.
Figure 8B:
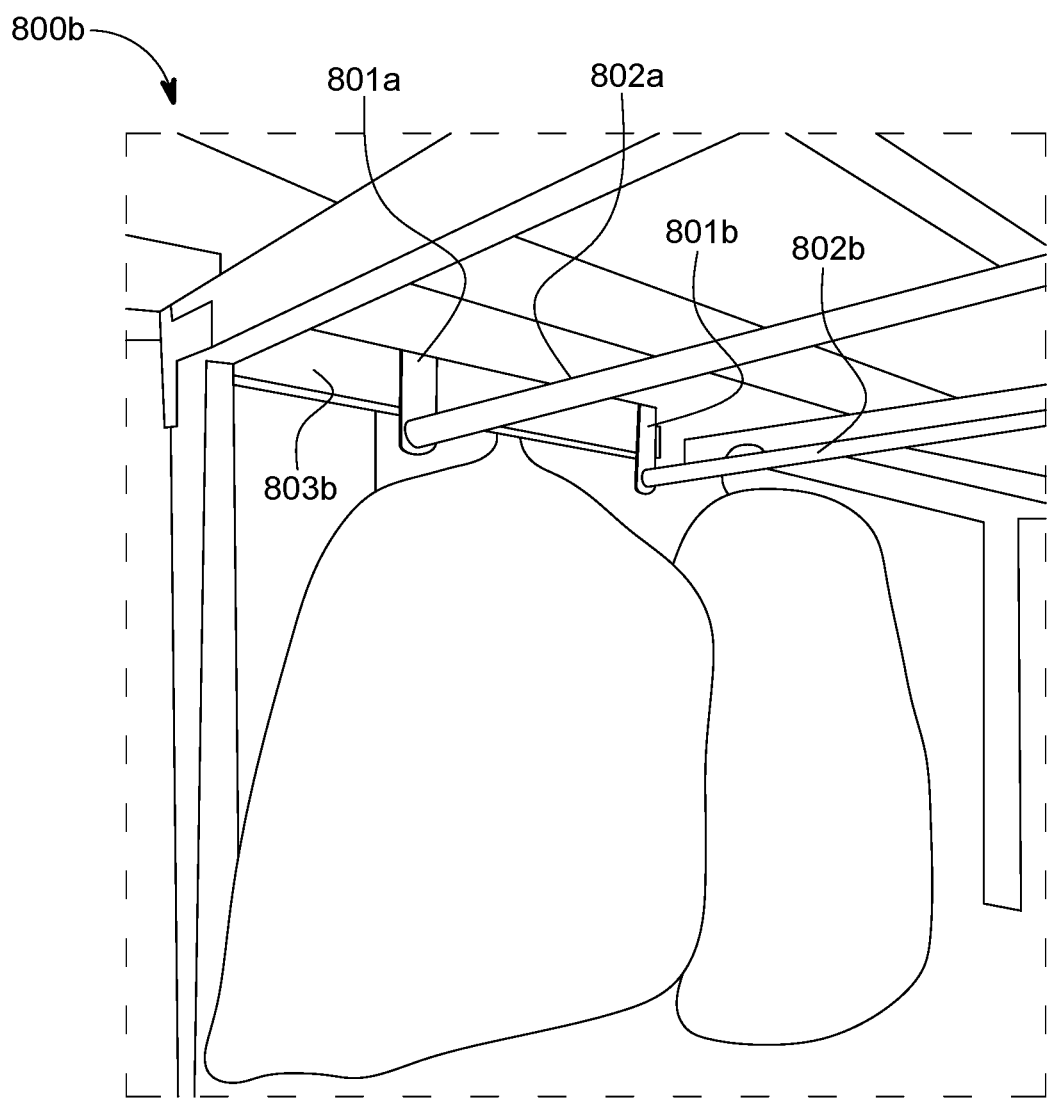

FIGS. 8a, 8b illustrate three embodiments of a hanging rod bracket 801, 801a and 801b for two embodiments of a moving and/or shelf-storage system a 800a, 800b, in accordance with the present subject matter. FIG. 8a illustrates a support structure 800a which includes a cylindrical rod bracket 801 (for hanging clothes) secured by a horizontal frame member 803a, for supporting the clothes-hanging rod 802. FIG. 8b illustrates shows a pair of such clothes-hanging cylindrical rod brackets 801a, 801b both supported by a horizontal frame member 803b, for supporting the two spaced-apart rods 802a, 802b.

Figure 9A:
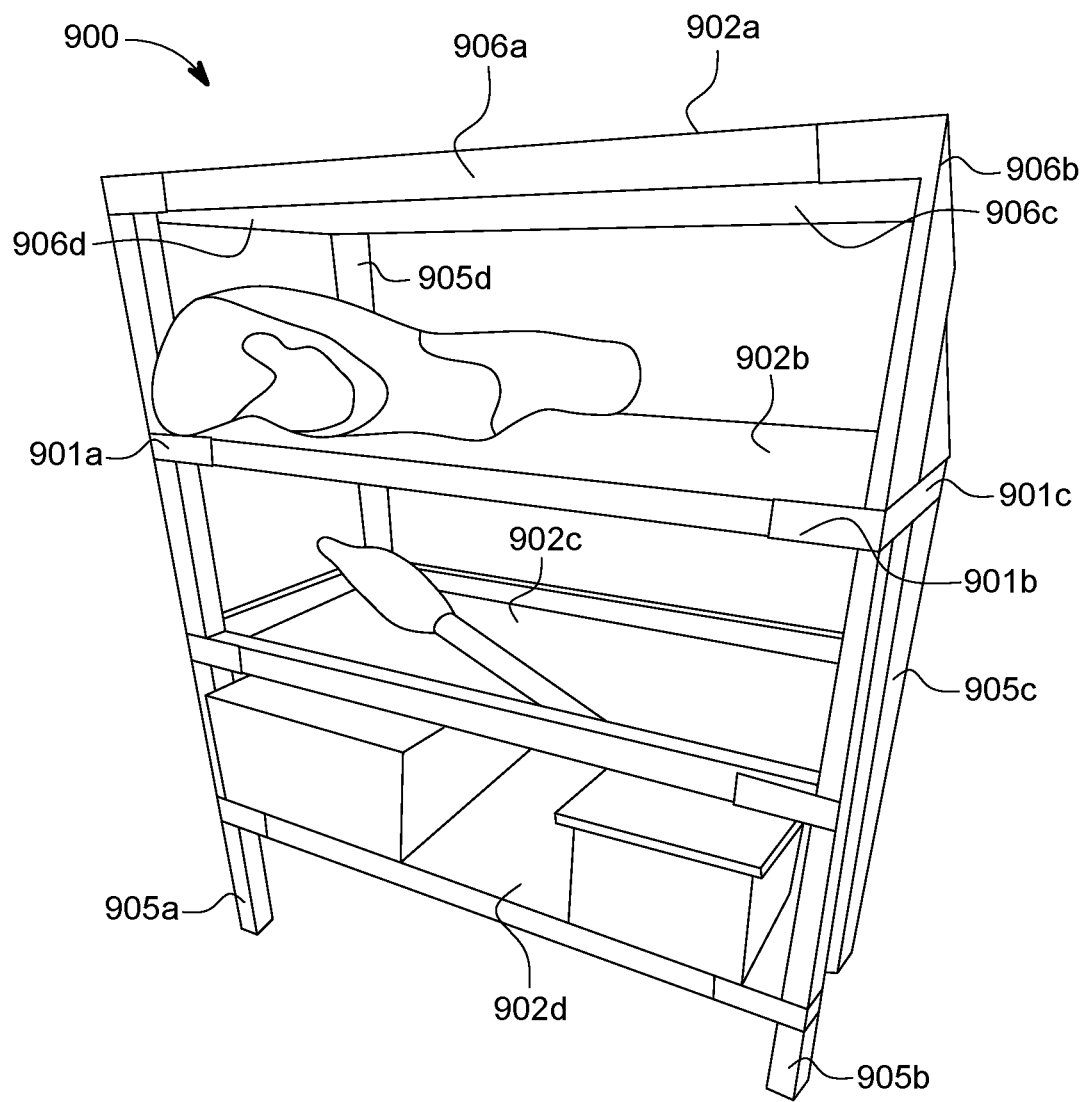
FIGS. 9a through 9c present three embodiments of a storage system of the present subject matter showing all three stacked vertically and one of them arranged side-by-side.
Figure 9B:
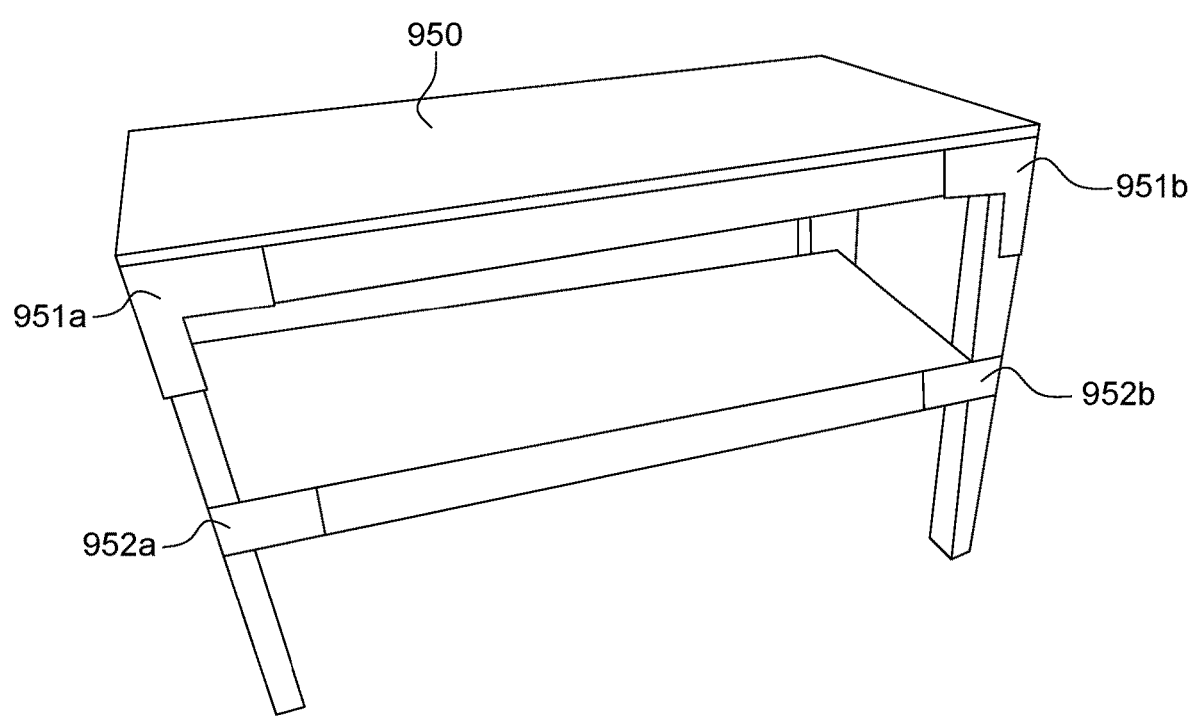
Figure 9C:
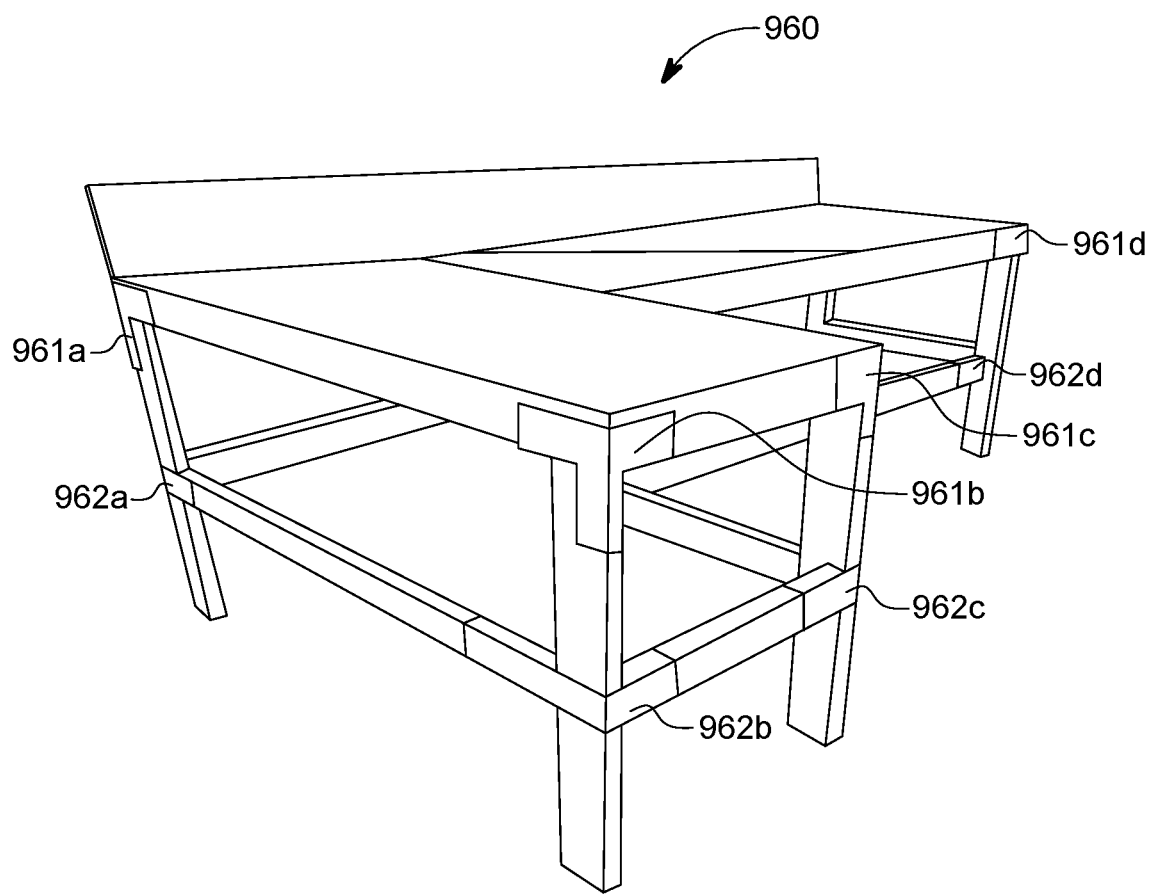

FIGS. 9a through 9c illustrate the use of several brackets for shelf-storage systems according to principles of the present subject matter. To assemble, a multi-level shelving unit 900 can be constructed using corner brackets 901a through 901c, shown in FIG. 9a. Next, a set of shelves 902a, 902b, 902c, 902d can be secured to vertical frame members 905a through 905d to construct the multilevel shelving unit 900. Each of the shelf-layers 902a through 902d can be located above, or beneath, the corresponding horizontal frame members 906a through 906d. When uppermost shelf-layer 902a is fixed atop horizontal frame member 906a, the uppermost shelf 902a is secured. Additional shelf-layers 902b, 902c, 902d are vertically affixed along legs 905a, 905b, and 905c, as desired, to provide shelves 902b, 902c, and 902d. FIG. 9b presents a dual-level worktable 950 made from a plurality of stacked corner brackets 951a, 951b and intermediate corner brackets 952a, 952b. Additional stacked corner brackets 951a, 951b and intermediate brackets 952a, 952b (not visible in FIG. 9c) can be incorporated into the dual-level worktable 950 shown.

FIG. 9c illustrates an L-shaped worktable 960. (A POSITA can appreciate that a desk having shorter legs could similarly be made.) The worktable 960 is made from a plurality of stacked corner brackets 961a through 961d and intermediate corner brackets 962a through 962d. Additional stacked brackets 961a through 961d and intermediate corner brackets 962a through 962d could be used to produce L-shaped worktable 960.

Figure 16:
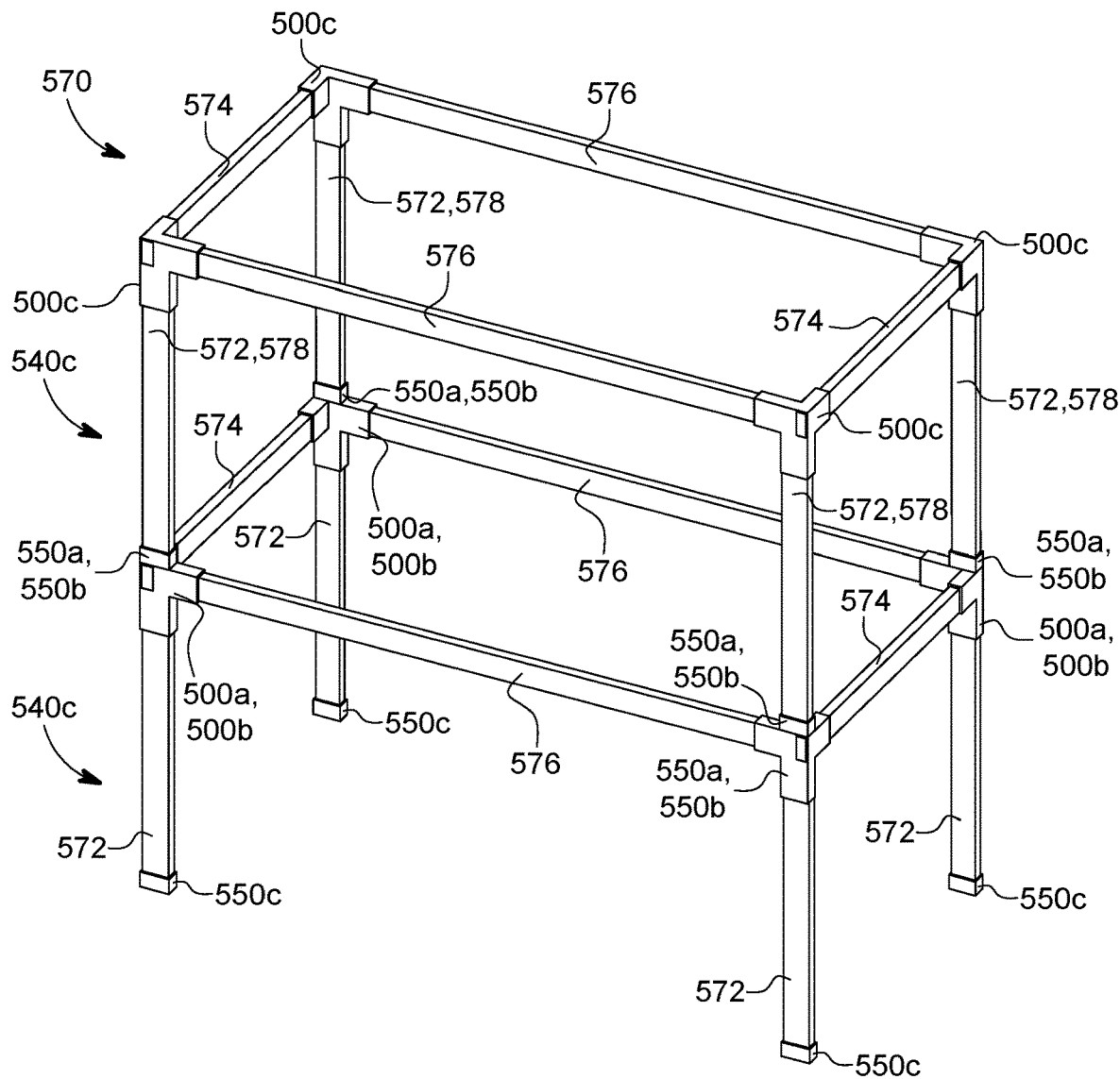
FIG. 16 shows a stacked version of a storage system of the present subject matter.

Turning now to FIG. 16—a moving and/or shelf-storage assembly 570 provided by a pair of vertically stacked shelf-storage systems 540c—shall next be described in detail.

While each shelf-storage system 540c can include spaced-apart depressions 520 (shown in FIGS. 10, 11) or the elongated hole or aperture 530 (shown in FIGS. 12, 13), which might be suggested by the joints 500a and 500b and the endcaps 550a and 550b (which are shown) where the vertically-stacked shelf-storage systems 540c are joined, it is nevertheless clear to a POSITA that the shelf-storage systems 540c shown in FIG. 16 could include an assortment of geometric features to securely join systems 570c together.

However, in sharp contrast, the four lowermost endcaps 550c have been designed to provide a substantially flat underside when placed on a floor or other surface, for maximum stability of the moving and/or shelf-storage assembly 570 presented in FIG. 16.

Moreover, the four uppermost joints 500c are designed to provide a substantially flat upper corner surface when they are used as the uppermost joints for assembly 570.

The assembly shown in FIG. 16 can be constructed as follows. Four equal lengths of a lumber member 572 are selected and an end portion of each lumber member 572 is inserted into an opening of one of the four endcaps 550c. Next, the opposite end portion of each of the lumber members 572 is inserted into an appropriate opening of a joint 500a or 500b. Then, two equal lengths of another lumber member 574 are selected; and the opposite ends of the lumber member 574 are inserted into the appropriate openings of two spaced-apart joints 500a or 500b. Next, two equal lengths of yet another lumber member 576 are selected; and the opposite ends of the lumber member 576 are inserted into the still-remaining, appropriate openings of the two spaced-apart joints 500a or 500b.

Assembly of a lower moving and/or shelf-storage system 540c is now completed.

Assembly of an upper moving and/or shelf-storage system 540c could include four equal lengths of the lumber member 572 or four equal lengths of another lumber member 578 (having a length different from lumber member 572) but must include two more equal lengths of the lumber member 574 and two more equal lengths of lumber member 576.

Assembly of the upper system 540c could proceed by joining the endcaps 550a or 550b to the joints 500a or 500b of the lower system 540c, followed by assembling the upper system 540c. Or assembly of the upper system 500c unit could be completed first, after which the upper system 500c is placed atop and secured to the lower system 540c.

What has been described in detail throughout this patent specification is a joint for a moving and/or shelf-storage system as well as the moving and/or shelf-storage system itself. Accordingly, while the present subject matter has been described with reference to exemplary embodiments, the present subject matter is not limited to these embodiments. On the contrary, many alternatives, changes, and modifications shall become apparent to a person of ordinary skill in the art (CPOSITA) after this patent specification including its associated drawing figures are reviewed. Therefore, all alternatives, changes, and/or modifications shall be understood as being treated as forming a part of the present subject matter insofar as they fall within the spirit and scope of the appended claims that follow.

I claim:

1. A storage assembly (570) comprising: at least two vertically stackable storage systems (540c), wherein each of the at least two vertically stackable storage systems (540c) comprises:
at least four vertically orientable load-support members (572) of equal predetermined length, wherein each of the at least four load-support members (572) defines a pair of spaced-apart end portions;
at least two shorter horizontally orientable lateral-support members (574) of equal predetermined length, wherein each of the at least two shorter lateral-support members (574) defines a pair of spaced-apart end portions;

at least two longer horizontally orientable lateral-support members (576) of equal predetermined length, wherein each of the at least two longer lateral-support members (576) defines a pair of spaced-apart end portions;

at least four joints (500a, 500b), each of which is sized and configured to receive and frictionally engage:
- one of the pair of spaced-part end portions of one of the at least four vertically orientable load-support members (572);
- one or the other of the pair of spaced-apart end portions of one of the at least two shorter horizontally orientable lateral-support members (574); and
- one or the other of the pair of spaced-apart end portions of one of the at least two longer horizontally orientable lateral-support members (576); and a hollow endcap (550) defining an open end portion (558) and a bottom end portion (554) spaced from the open end portion (558), wherein the open end portion (558) is sized and configured to receive and frictionally engage the other end portion of one of the at least four vertically orientable load-support members (572);

wherein one of the at least two vertically stackable storage systems (540c) is a lower storage system, wherein each one of the joints (500a, 500b) of the lower storage system define at least one depression (520) within or at least one opening (530) through an upper surface thereof, and wherein another one of the at least two stackable storage systems (540c) is an upper storage system, wherein the bottom end portion (554) of each endcap (550) of the upper storage system defines at least one projection sized and configured to snuggly fit into the at least one depression (520) or the at least one opening (530) through the upper surface of a respective one of the at least four joints (500a, 500b) associated with the lower storage system, for vertically stacking each respective one of the endcaps (550) of the upper storage system atop an associated respective one of the at least four joints (500a, 500b) of the lower storage system.

2. The storage assembly (570) of claim 1, wherein each joint (500a, 500b) comprises:
- a first hollow joint member (502a, 502b) having a first predetermined length and defining a first joint member opening (512a, 512b);
- a second hollow joint member (504a, 504b) having a second predetermined length and defining a second joint member opening (514a, 514b); and
- a third hollow joint member (506a, 506b) having a third predetermined length and defining a third joint member opening (516a, 516b).

3. The storage assembly (570) of claim 1, wherein each one of the joints (500a, 500b) is of one-piece construction and is made from a polymeric material selected from the group consisting of a polyethylene, a polypropylene, and a polyurethane.

4. The storage assembly (570) of claim 1, wherein each of the vertically orientable load-support members (572) is made of lumber and wherein each of the shorter and longer horizontally orientable lateral-support members (574, 576) is made of lumber.

* * * * *